T. E. MURRAY, Jr., AND J. B. MURRAY.
ELECTRICALLY WELDED TUBE.
APPLICATION FILED JULY 3, 1920.
1,363,159. Patented Dec. 21, 1920.
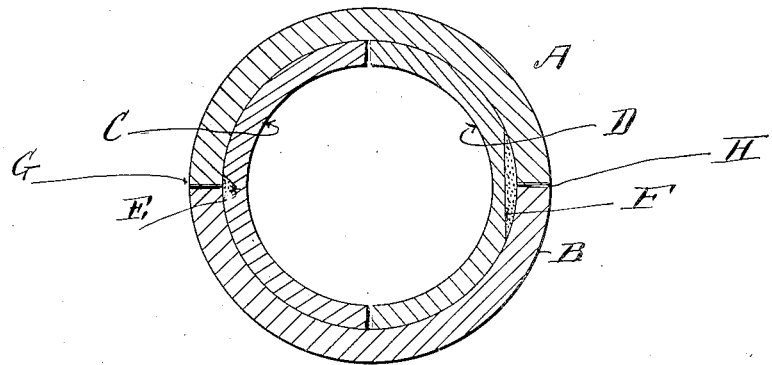
Inventors
Thomas E. Murray Jr
Joseph B. Murray
By their Attorney

UNITED STATES PATENT OFFICE.

THOMAS E. MURRAY, JR., AND JOSEPH B. MURRAY, OF BROOKLYN, NEW YORK.

ELECTRICALLY-WELDED TUBE.

1,363,159.  Specification of Letters Patent.  Patented Dec. 21, 1920.

Application filed July 3, 1920. Serial No. 393,861.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Electrically-Welded Tubes, of which the following is a specification.

Where two tubes are united one within the other by electrical welding, it is sometimes desirable that not only the outer tube but the inner tube should be made in longitudinal half sections; the purpose being to allow whatever object is to be placed in the inner tube to be put in position therein before the welding operation, thus avoiding the need of drawing said object into the tube through an end thereof. The invention consists in the construction hereinafter set forth.

The accompanying drawing is a transverse section of the combined tubes electrically welded together.

The outer tube is made in two longitudinal half sections A, B, and the inner tube in two longitudinal half sections C, D. In the wall of each section of the inner tube is a groove, as shown at E—or instead of a groove, a portion of the outer periphery of said wall may be cut away, as shown at F.

In assembling the parts, the two half sections C, D of the inner tube are placed within one of the half sections, as B, of the outer tube, so that the plane including the joint between said sections C, D, shall be at an angle—preferably 90° as shown—to the plane including the straight edges of said section B. If any desired object—as, for example, a cable conductor—is to be inclosed in the inner tube, it may be placed between sections C, D thereof before said sections are seated in section B. Said sections C, D then remain in contact, but are not welded together at their edges. The section A of the outer tube being placed upon section B, is electrically welded thereto. The position of the grooves E (or cut away portions F) in sections C, D is to be such as that said grooves or cutaway portions will come opposite the joints G, H between sections A, B, so that the metal extruded from said joints during the welding operation will enter the chambers formed by said grooves or cutaway portions, and so lock each section C, D to the outer tube.

We claim:

1. The combination of a metal outer tube and a metal inner tube, each of said tubes being formed in two longitudinal half sections, the sections of said inner tube being placed within said outer tube in contact but unwelded, and the sections of said outer tube being electrically welded together; the plane of the unwelded joints between the sections of the inner tube being disposed at an angle to the plane of the welded joints between the sections of the outer tube.

2. The combination of claim 1, further including means for locking each section of the inner tube to said outer tube.

3. The combination of a metal outer tube and a metal inner tube, each of said tubes being formed in two longitudinal half sections, the sections of said inner tube being placed within said outer tube in contact but unwelded and each having a groove formed in the outer periphery of its wall, and the sections of said outer tube being electrically welded together; the plane of the unwelded joints between the sections of the inner tube being disposed at right angles to the plane of the welded joints between the sections of the outer tube, and the grooves in the sections of said inner tube being disposed opposite to the welded joints of said outer tube.

In testimony whereof we have affixed our signatures in the presence of two witnesses.

THOMAS E. MURRAY, JR.
JOSEPH B. MURRAY.

Witnesses:
GERTRUDE P. PORTER,
MAY T. MCGARRY.